(12) United States Patent
Yasoshima

(10) Patent No.: US 8,848,022 B2
(45) Date of Patent: Sep. 30, 2014

(54) VIDEO CONFERENCE APPARATUS, METHOD, AND STORAGE MEDIUM

(75) Inventor: Mizuho Yasoshima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 195 days.

(21) Appl. No.: 13/433,843

(22) Filed: Mar. 29, 2012

(65) Prior Publication Data

US 2012/0274728 A1    Nov. 1, 2012

(30) Foreign Application Priority Data

Apr. 27, 2011    (JP) .................................. 2011-100069

(51) Int. Cl.
   *H04N 7/14*    (2006.01)

(52) U.S. Cl.
   USPC ..................................... 348/14.07; 348/14.08

(58) Field of Classification Search
   USPC .................................. 348/14.01, 14.07, 14.08
   See application file for complete search history.

(56) References Cited

U.S. PATENT DOCUMENTS

| | | | |
|---|---|---|---|
| 5,432,525 A | 7/1995 | Maruo et al. | |
| 5,915,091 A * | 6/1999 | Ludwig et al. | 709/204 |
| 6,008,809 A * | 12/1999 | Brooks | 715/792 |
| 6,025,871 A | 2/2000 | Kantor et al. | |
| 8,467,509 B2 * | 6/2013 | Oya | 379/93.21 |
| 8,527,907 B2 * | 9/2013 | Goshey | 715/863 |
| 2010/0287496 A1 * | 11/2010 | Kim et al. | 715/798 |
| 2012/0030616 A1 * | 2/2012 | Howes et al. | 715/800 |

FOREIGN PATENT DOCUMENTS

| | | |
|---|---|---|
| JP | 03-157084 A | 7/1991 |
| JP | 2004-259158 A | 9/2004 |
| JP | 2011-066670 A | 3/2011 |
| WO | 2010/104400 A1 | 9/2010 |

OTHER PUBLICATIONS

JP Notice of Reasons fo Rejection mailed Apr. 22, 2014, JP Appln. No. 2011-100069, English translation.

* cited by examiner

*Primary Examiner* — Olisa Anwah

(74) *Attorney, Agent, or Firm* — Banner & Witcoff, Ltd.

(57) ABSTRACT

An aspect of the present disclosure provides for connection to a video conference apparatus at a remote site. A method includes initiating transmission of an image of shared content to the video conference apparatus at the remote site, the image of the shared content representing data shared with the video conference apparatus; determining, when the transmission of the image is initiated, a first region and a second region in an output image; monitoring the shared content which is being transmitted; determining whether an instruction for full-screen display is issued regarding the monitored shared content; and causing the full-screen display of the image of the shared content to fit in the first region when the instruction for full-screen display is issued.

20 Claims, 14 Drawing Sheets

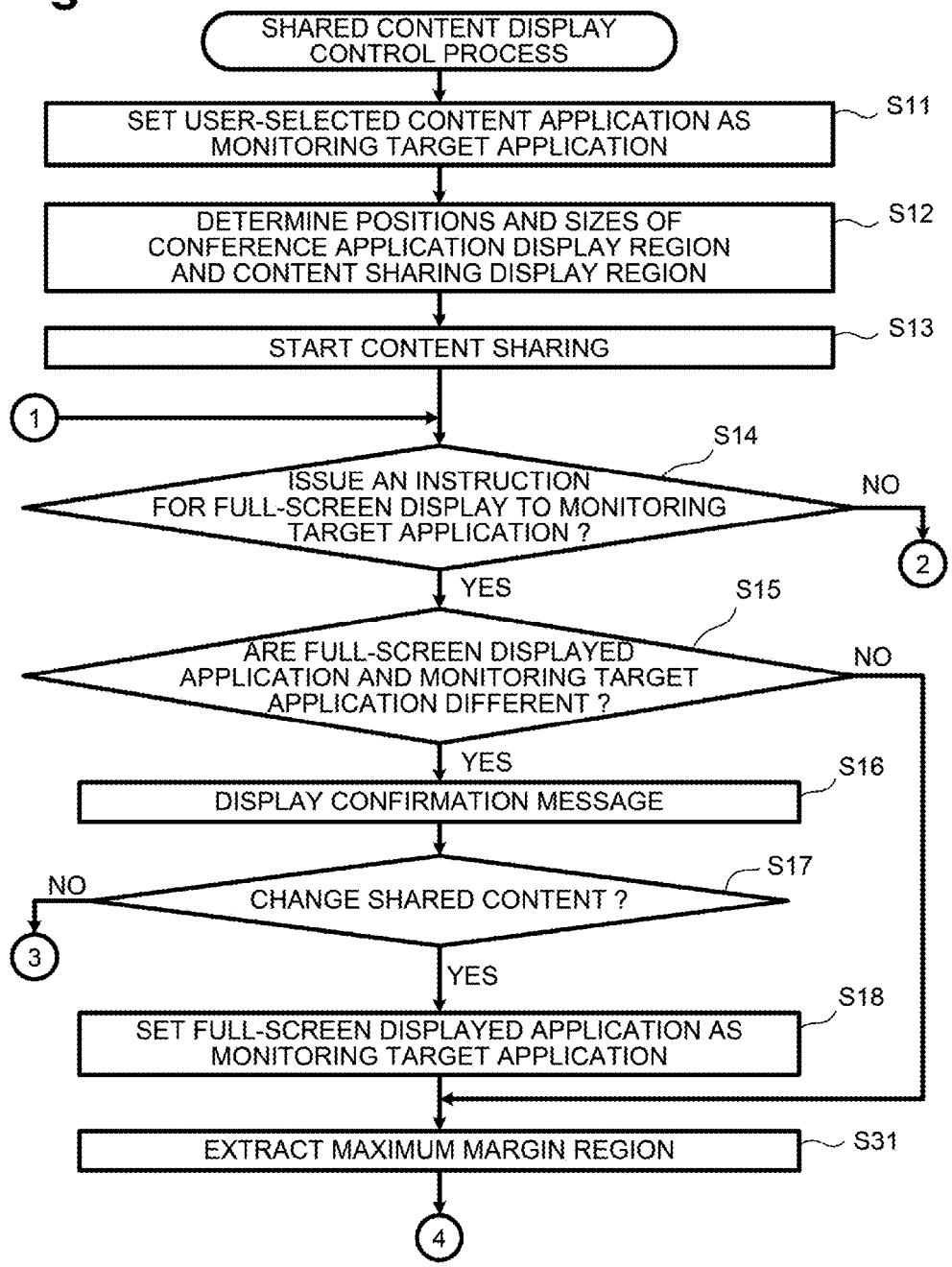

VIDEO CONFERENCE APPARATUS, METHOD, AND STORAGE MEDIUM

CROSS-REFERENCE TO RELATED APPLICATION

This Application claims priority from JP2011-100069 filed on Apr. 27, 2011, the content of which is hereby incorporated by reference.

BACKGROUND OF THE DISCLOSURE

1. Field of the Disclosure

The present disclosure relates to a video conference apparatus.

2. Description of the Related Art

Video conference apparatuses enable remote conferences by transmitting images and audio to and receiving images and audio from other video conference apparatuses installed in other sites through networks. Such a video conference apparatus may share content with other video conference apparatuses and display the content in a screen during a video conference. For example, a multimedia teleconference apparatus capable of displaying, in the same screen, images of shared content and images captured in other sites by other apparatuses is generally known.

BRIEF SUMMARY

In conventional techniques, when an instruction for full-screen display is performed for displaying shared content as, images captured in other sites are hidden by the image of the shared content. This is inconvenient since users are not able to simultaneously view the image of the shared content and the images captured at the other sites.

Aspects of the present disclosure provide an ability to simultaneously display images captured in other sites and an image of shared content in the same screen even when an instruction for displaying the shared content in full-screen is issued in a video conference.

An aspect of the present disclosure provides for connection to a video conference apparatus installed in another site; start transmitting an image of shared content to the video conference apparatus, the image of the shared content representing data shared with the video conference apparatus; determination, when the transmitting of the image is started, a first region and a second region in an output image, the first region in which the image of the shared content is displayed being a portion of the output image, the second region in which a captured image is displayed being another portion of the output image and including at least a portion different from the first region, the captured image being captured by an image capturing unit included in the video conference apparatus installed in the another site; monitoring a state of the shared content which is started to be transmitted; determination whether an instruction for full-screen display is issued to the monitored shared content; and performing the full-screen display of the image of the shared content to fit the image of the shared content to the first region when the instruction for full-screen display is issued.

BRIEF DESCRIPTION OF THE DRAWINGS

For a more complete understanding of the disclosure, the needs satisfied thereby, and the aspects, features, and advantages thereof, reference now is made to the following description taken in connection with the accompanying drawings.

FIG. 11A is a part of a flowchart illustrating a modification of the shared content display control process.

DETAILED DESCRIPTION

Figure 1:
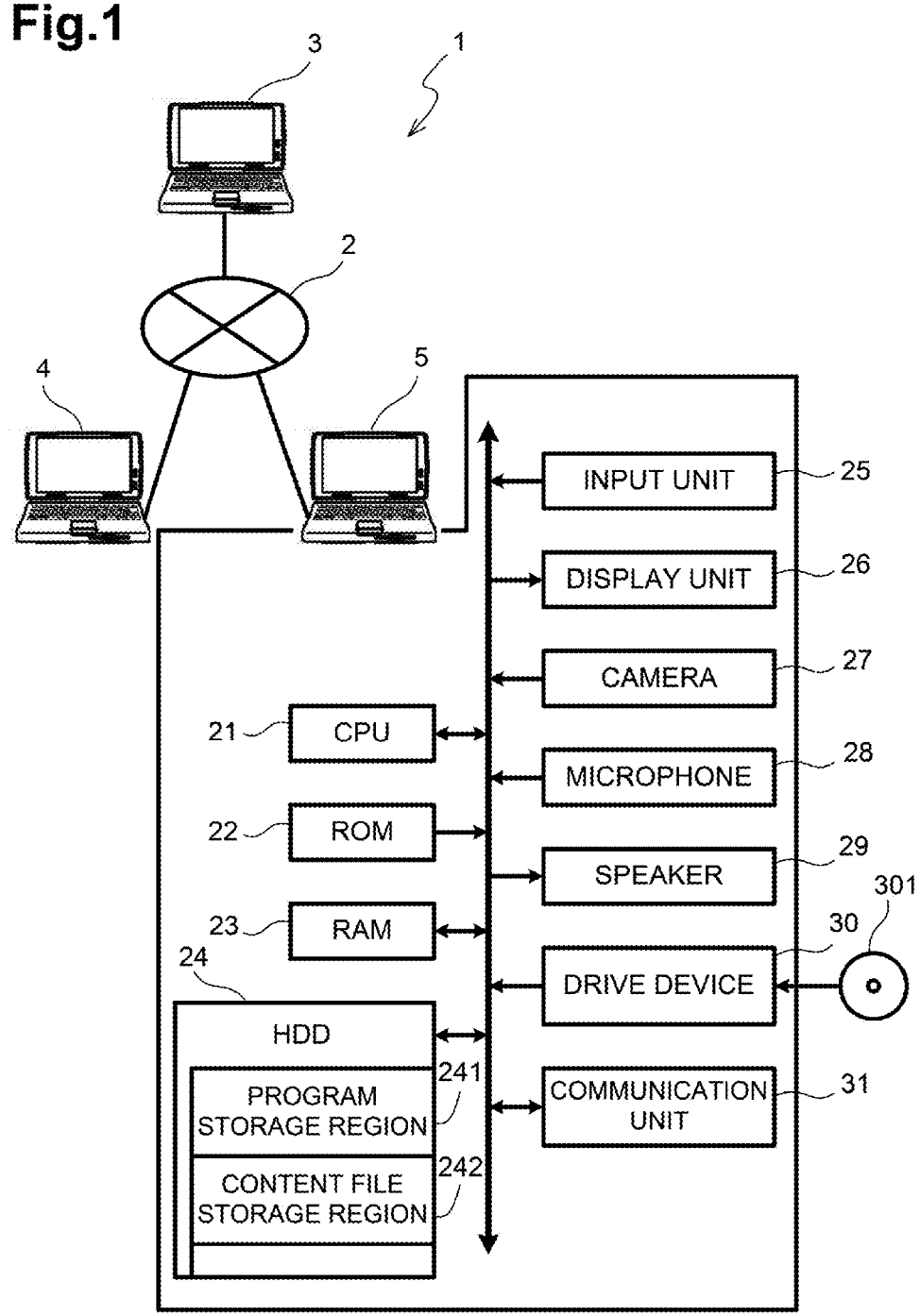
FIG. 1 is a diagram illustrating a configuration of a conference system and an electric configuration of a video conference apparatus.

Hereinafter, a video conference apparatus 5, a method, and a storage medium according to illustrative embodiments of the present disclosure will be described with reference to the accompanying drawings. The drawings are used to explain technical features employed in the present disclosure. Configurations of apparatuses and flowcharts of various processes shown in the drawings are merely examples and the present disclosure is not limited thereto. The video conference apparatus 5 is included in a conference system 1 shown in FIG. 1.

First, a configuration of the conference system 1 is described. As shown in FIG. 1, the conference system 1 includes a video conference apparatus 3 installed in a site A, a video conference apparatus 4 installed in a site B, and the video conference apparatus 5 installed in a site C. The video conference apparatuses 3 to 5 are connected to one another through a network 2. The video conference apparatuses 3 to 5 enable a remote conference by transmitting and receiving various data such as images and audio. The video conference apparatuses 3 to 5 have a function of performing a telephone call among users at different sites (IP (Internet Protocol) telephone function). The SIP (Session Initiation Protocol), for example, is used as a call control protocol which realizes the IP telephone function. The video conference apparatuses 3 to 5 are dedicated terminals, for example. However, each of the video conference apparatuses 3 to 5 may be configured by installing dedicated programs into a stationary personal computer or a cellular phone.

Each of the video conference apparatuses 3 to 5 has identification information assigned thereto. When the SIP is used, for example, an SIP address serves as the identification information. A user calls a video conference apparatus of a specific user in another site by specifying an SIP address so as to talk to the specific user. In this illustrative embodiment, the SIP address is used as a terminal ID serving as the identification information. As the terminal ID, not only the SIP address, but also an IP address, a MAC (Media Access Control) address, or the like may be used.

Next, an electric configuration of the video conference apparatus 5 will be described. Electric configurations of the video conference apparatuses 3 and 4 are the same as that of the video conference apparatus 5, and therefore, descriptions thereof are omitted. As shown in FIG. 1, the video conference apparatus 5 includes a CPU 21 which controls the video conference apparatus 5. The CPU 21 is electrically connected to a ROM 22, a RAM 23, a hard disk drive (HDD) 24, an input unit 25, a display unit 26, a camera 27, a microphone 28, a speaker 29, a drive device 30, and a communication unit 31. The ROM 22 stores boot programs, BIOS (Basic Input/Output System), and an OS (Operating System). The RAM 23 stores a timer, a counter, and temporary data.

The HDD 24 includes a program storage region 241 which stores various programs and a content file storage region 242 which stores content files associated with applications of a variety of content (hereinafter referred to as "content applications"). The content applications are included in the various programs stored in the program storage region 241. The content files and the content applications are examples of shared content. Specifically, the shared content includes not only the content files stored in the content file storage region 242 but also the content applications executed by reading the content files. Examples of the content applications can include PowerPoint (Microsoft PowerPoint presentation graphics program) (registered trademark), Adobe Acrobat Reader (registered trademark) capable of displaying Adobe PDF (Portable Document Format), word applications, spreadsheet applications, and image viewers and the like. The input unit 25 may include a keyboard and a mouse which accepts user's inputs. The display unit 26 may include a liquid crystal display which displays desired images, for example. The drive device 30 can read information stored in the storage medium 301. When the storage medium 301 is an optical medium, for example, the drive device 30 serves as an optical drive capable of reading optical media. When the video conference apparatus 5 is set up, for example, a "display control program" stored in the storage medium 301 is read by the drive device 30. Then, the "display control program" is stored in the program storage region 241 included in the HDD 24. However, the "display control program" may be stored in a storage medium included in an external server. In this case, the "display control program" is downloaded from the external server via the communication unit 31, and then, the "display control program" is stored in the program storage region 241. The communication unit 31 performs communication with the other video conference apparatuses 3 and 4 through the network 2.

Figure 2:
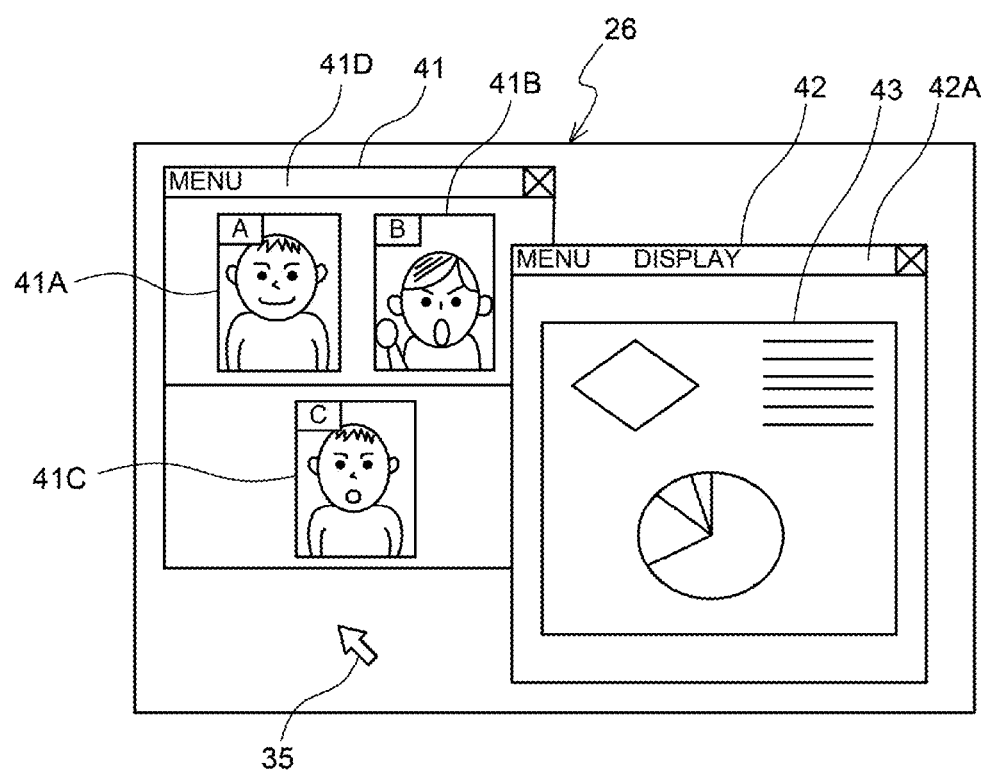
FIG. 2 is a diagram illustrating a display unit displaying a content screen before content is shared.

Next, content sharing in a video conference is described. As shown in FIG. 2, the video conference apparatus 5 displays content images in the display unit 26 by activating various content applications in the video conference. The content images may be shared with the video conference apparatuses 3 and 4 installed at the other sites as shared content images. The shared content images are also displayed in the display units 26 of the video conference apparatuses 3 and 4. Therefore, the users in the sites A to C may view the same shared content images and camera images captured in the sites A to C using the video conference apparatuses 3 to 5 in the video conference.

For example, the display unit 26 of the video conference apparatus 5 displays a video-conference screen 41 and a content screen 42. The video-conference screen 41 is an image output by a video-conference application (hereinafter referred to as a "conference application"). In the video-conference screen 41, site screens 41A and 41B are laterally adjacent to each other in an upper half portion of the video-conference screen 41. A site screen 41C is separately displayed in a lower half portion of the video-conference screen 41. The site screen 41A is a camera image captured in the site A. The site screen 41B is a camera image captured in the site B. The site screen 41C is a camera image captured in its own site (site C). In an uppermost portion of the video-conference screen 41, a toolbar 41D used to select one of various functions such as a menu function using a pointer 35 is displayed. The user selects a desired operation from a list of the functions using the pointer 35.

On the other hand, the content screen 42 is an image of a content file stored in the content file storage region 242 included in the HDD 24. The content screen 42 is the image based on a content file output by a presentation content application (hereinafter referred to as a "presentation application"). An image generated on the basis of a content file of PowerPoint (registered trademark), for example, corresponds to the content screen 42. The content screen 42 includes a presentation screen 43 substantially in a center thereof In an uppermost portion of the content screen 42, a toolbar 42A used to select one of various functions including a menu function and a display function using the pointer 35 is displayed. When the user moves the pointer 35 onto one of the various functions displayed in the toolbar 42A, various operations associated with the selected function are displayed below as a list. The user can select a desired operation from the list of the functions using the pointer 35. The user can create a graph, a graphic, a table, or the like in the presentation screen 43 or inputs text or the like. In this way, presentation content is created in the presentation screen 43.

Figure 3:
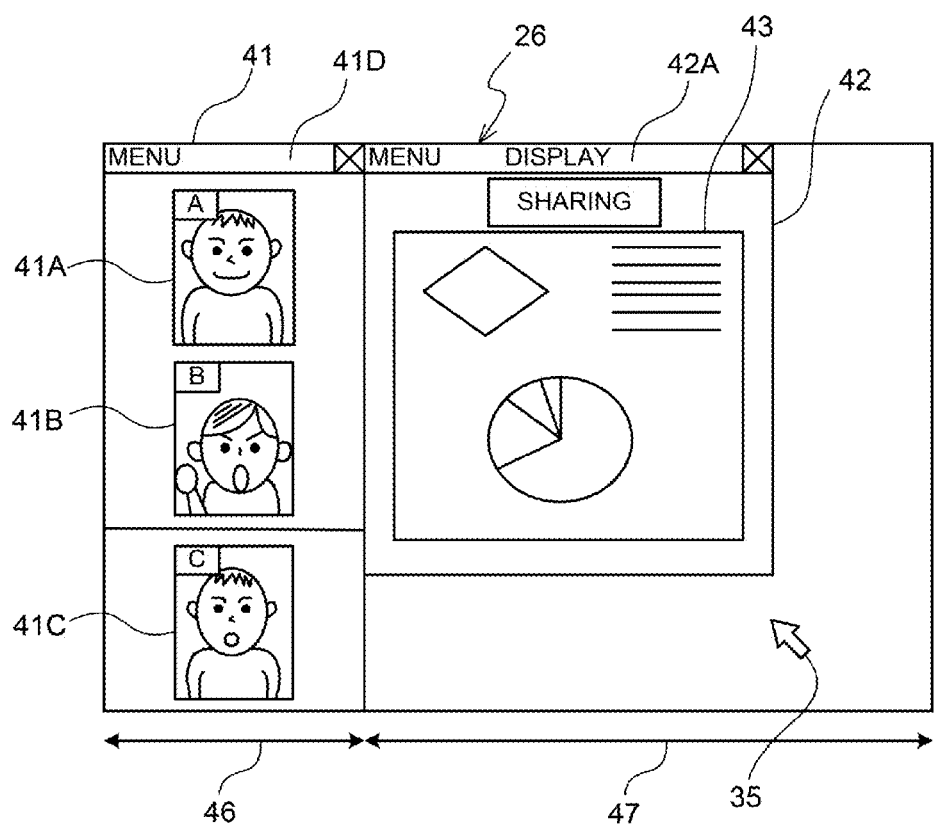
FIG. 3 is a diagram illustrating the display unit displaying the content screen after the content is shared.

When the user of the video conference apparatus 5 moves the pointer 35 onto a menu of the tool bar 41D included in the video-conference screen 41, a list of various operations is displayed below the menu. The user selects a button "start of content sharing" (not shown) from the list to set the content screen 42 as shared content. Then the content sharing is started, and as shown in FIG. 3, the display unit 26 is divided into a conference application display region 46 and a content sharing display region 47. The conference application display region 46 is displayed on a left side whereas the content sharing display region 47 is displayed on a right side. In this illustrative embodiment, the content sharing display region 47 is larger than the conference application display region 46. However, a size ratio may be arbitrarily changed.

The video-conference screen 41 is displayed in the conference application display region 46. The content screen 42 is displayed in the content sharing display region 47. An aspect ratio of the video-conference screen 41 is changed in accordance with a size of the conference application display region 46 which is vertically long. In the video-conference screen 41, arrangement of the site screens 41A to 41C is changed. In this illustrative embodiment, the site screens 41A to 41C are vertically aligned in this order from the top. On the other hand, the content screen 42 is displayed in the content sharing display region 47 while maintaining an aspect ratio thereof. A message "sharing" is displayed in an upper center portion of the content screen 42. Therefore, the user of the video conference apparatus 5 can recognize that the content screen 42 is being shared with the other sites. In this way, the users in the sites A to C can view the same content screen 42 using the display units 26 of their respective video conference apparatuses 3 to 5.

Next, a function of displaying the presentation application in full-screen will be described. The content screen 42 shown in FIG. 2 is a screen of the presentation application. The presentation application has a function of performing full-screen display in the display unit 26. Note that "full-screen display" means that a certain screen is displayed to fit a screen of the display unit 26. Specifically, in a case of the presentation application of the content screen 42, full-screen display of the presentation screen 43 included in the content screen 42 may be performed. Although described hereinafter, when an instruction for full-screen display is issued to the presentation application, an application different from the presentation application is activated and full-screen display of a presentation screen 45 (refer to FIG. 7) which is the same as the presentation screen 43 is performed. In this case, the presentation screen 45 is displayed in the display unit 26 in full-screen. Then, in this illustrative embodiment, in the video conference, when the user issues an instruction of full-screen display to the content application of the content screen 42, the presentation screen 45 can be displayed in full-screen in the content sharing display region 47 without covering the video-conference screen 41.

Figure 4:
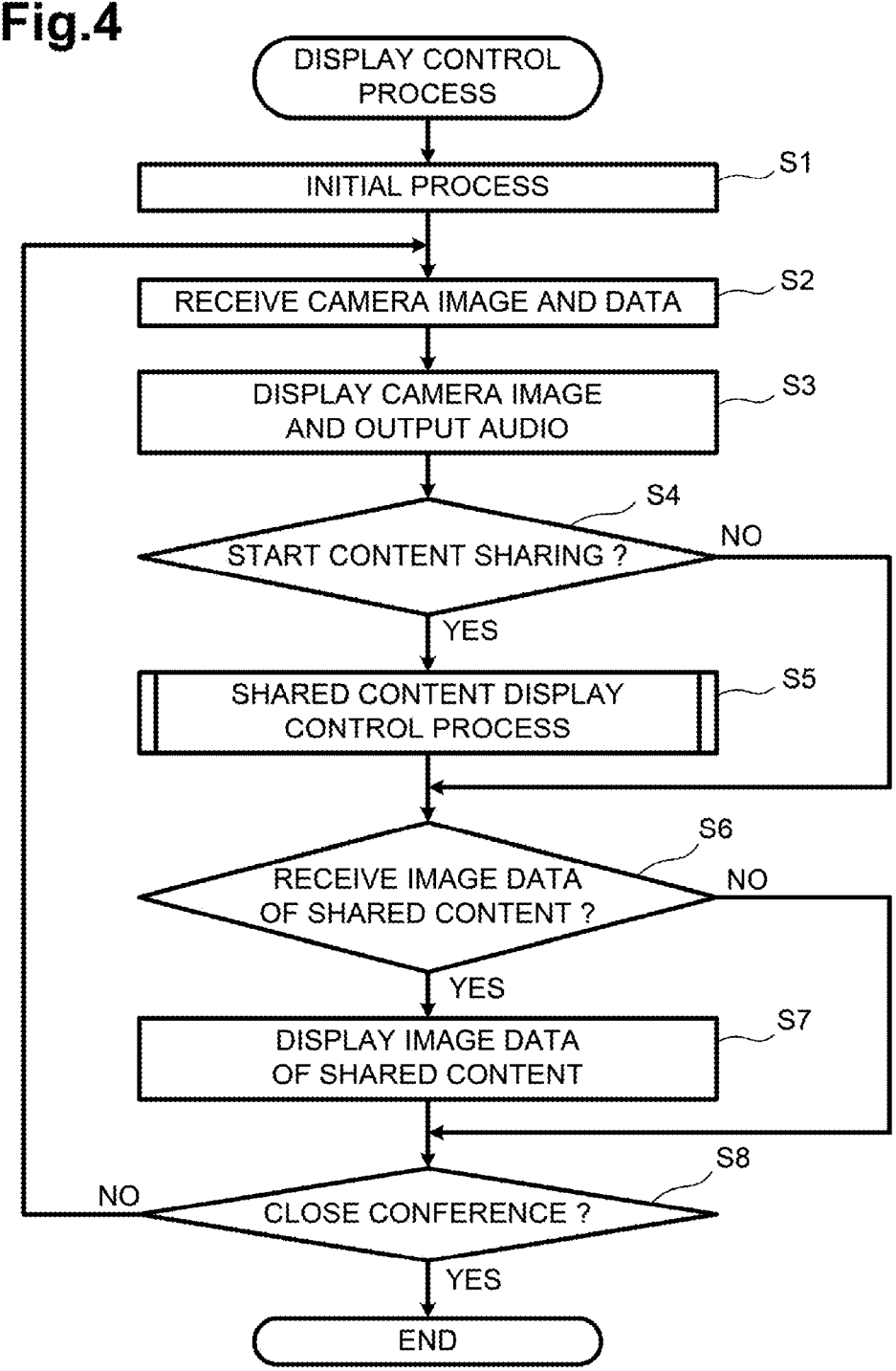
FIG. 4 is a flowchart illustrating a display control process.

Next, referring to FIG. 4, a display control process performed by the video conference apparatus 5 in a video conference is described. This process is started when the user selects an instruction representing "start of video conference" from the menu displayed in the display unit 26 using the input unit 25 such as a mouse while the video conference apparatus 5 is connected to the video conference apparatuses 3 and 4. In response to the instruction issued by the user, the display control program stored in the program storage region 241 of the HDD 24 is activated and the CPU 21 executes this program whereby the process is executed.

First, the CPU 21 clears data stored in the RAM 23 and the like and performs an initial process (in step S1). The CPU 21 transmits image data of a camera image captured by the camera 27 and audio data of audio input from the microphone 28 to the video conference apparatuses 3 and 4 and receives image data of camera images and audio data of audio from the video conference apparatuses 3 and 4 which are connected to the video conference apparatus 5 (in step S2). The CPU 21 controls display of the camera image of its own site and the camera images supplied from the other video conference apparatuses 3 and 4 in the site screens 41A to 41C included in the video-conference screen 41. The CPU 21 outputs the audio corresponding to the received audio data from the speaker 29 (in step S3).

The CPU 21 determines whether an instruction for starting content sharing is input by the user (in step S4). The user selects a button "start of content sharing" (not shown) disposed on the video-conference screen 41 to instruct start of content sharing. In this case, it is determined that the instruction for starting content sharing is input. When it is determined that the instruction for starting content sharing is input (that is, when the determination is affirmative in step S4), the CPU 21 executes a shared content display control process (in step S5). Although described in detail hereinafter, in the shared content display control process, content sharing is started when the CPU 21 starts a transmission of shared content image data to the video conference apparatuses 3 and 4. Furthermore, the CPU 21 appropriately controls display states of the video-conference screen 41 and the content screen 42 which are displayed in the display unit 26 in its own site. The video conference apparatuses 3 and 4 which have received the shared content image data display the shared content image data supplied from the video conference apparatus 5 in the display units 26 of their video conference apparatuses 3 and 4.

On the other hand, when it is determined that the instruction for starting content sharing is not input (that is, when the determination is negative in step S4), the CPU 21 determines whether image data of shared content is received from the other video conference apparatus 3 or 4 (in step S6). When it is determined that the shared content image data is received from the video conference apparatus 3 or 4 (that is, when the determination is affirmative in step S6), the CPU 21 displays an image representing the received shared content image data in the display unit 26 (in step S7). Subsequently, the CPU 21 determines whether an instruction for closing the conference is input (step S8). Note that, when it is determined that the shared content image data is not received from the video conference apparatuses 3 and 4 (that is, when the determination is negative in step S6), the CPU 21 determines whether the instruction for closing the conference is input by the user (in step S8). When the instruction for closing the conference is not issued (that is, when the determination is negative in step S8), the CPU 21 returns to step S2 and the process described above is repeatedly performed. When it is determined that the instruction for closing the conference is input (that is, when the determination is affirmative in step S8), the CPU 21 terminates this process.

Next, the shared content display control process will be described with reference to a flowchart shown in FIG. 5. When the instruction for starting content sharing is input in step S4 of the display control process, the CPU 21 executes this process. The CPU 21 first sets a content application selected by the user as a target of the content sharing as a monitoring target application (in step S11). The setting of the monitoring target application may be performed, for example, by extracting a list of applications being executed in the video conference apparatus 5 and selecting the content application from the list by the user. Content of input to the monitoring target application and content of output from the monitoring target application are monitored. Next, the CPU 21 determines positions and sizes of the conference application display region 46 and the content sharing display region 47 in the display unit 26 (in step S12). The positions and the sizes of the conference application display region 46 and the content sharing display region 47 are preset by the user. The positions and the sizes of the regions set by the user are stored in the HDD 24 as region information. The CPU 21 determines the positions and the sizes of the regions by obtaining the region information stored in the HDD 24.

The CPU 21 transmits the shared content image data of the content screen 42 to the video conference apparatuses 3 and 4 to start content sharing (in step S13). When the content sharing is started, the display unit 26 is divided into the conference application display region 46 and the content sharing display region 47 as shown in FIG. 3. The video-conference screen 41 is resized and displayed in the conference application display region 46 and the content screen 42 is resized and displayed in the content sharing display region 47. A message "sharing" is displayed in the content screen 42. Note that the video conference apparatuses 3 and 4 which have received the shared content image data display the image displayed in the content screen 42 which is supplied from the video conference apparatus 5 in the display units 26 of the video conference apparatuses 3 and 4.

Figure 6:
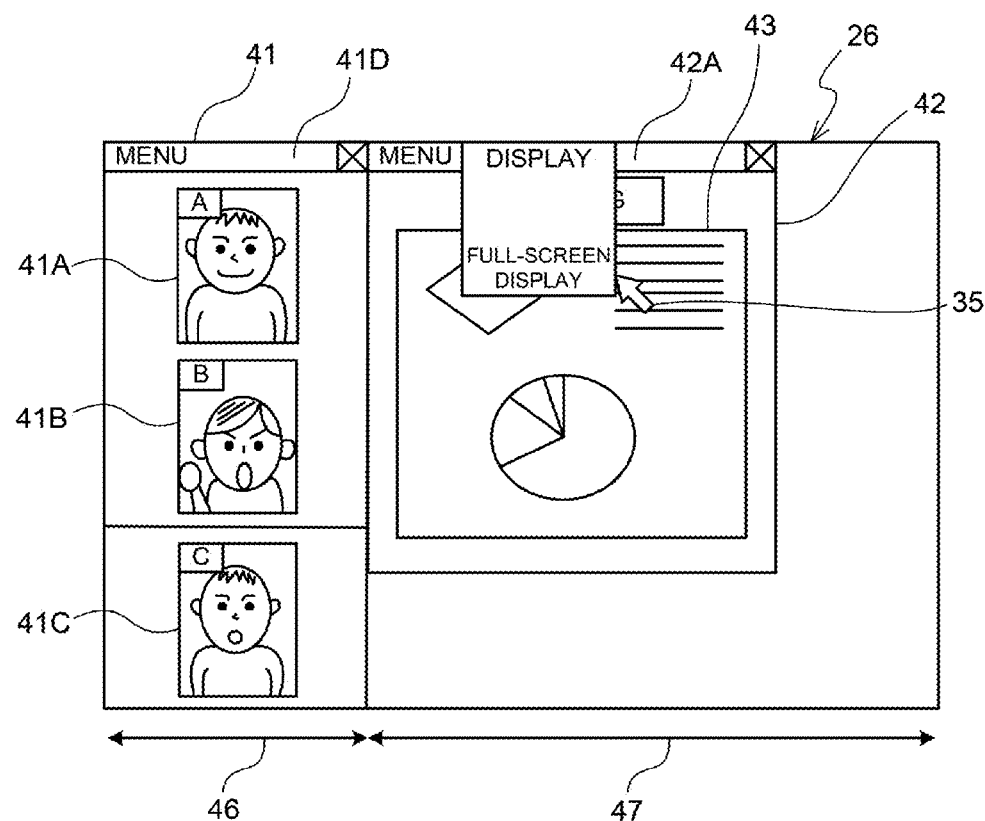
FIG. 6 is a diagram illustrating the display unit displaying a case where full-screen display is to be selected in the content screen.

The CPU 21 determines whether an instruction for full-screen display is issued to the content screen 42 of the monitoring target application (in step S14). The content screen 42 is an editor screen of the presentation application. In the presentation application, the presentation screen 43 included in the content screen 42 can be displayed in full-screen as described above. The user moves the pointer 35 onto a button "display" included in the toolbar 42A. Then, as shown in FIG. 6, a list of various operations associated with the button "display" is displayed below the button "display", and the list includes a button "full-screen display". The user selects the button "full-screen display" from the operation list using the pointer 35.

Figure 7:
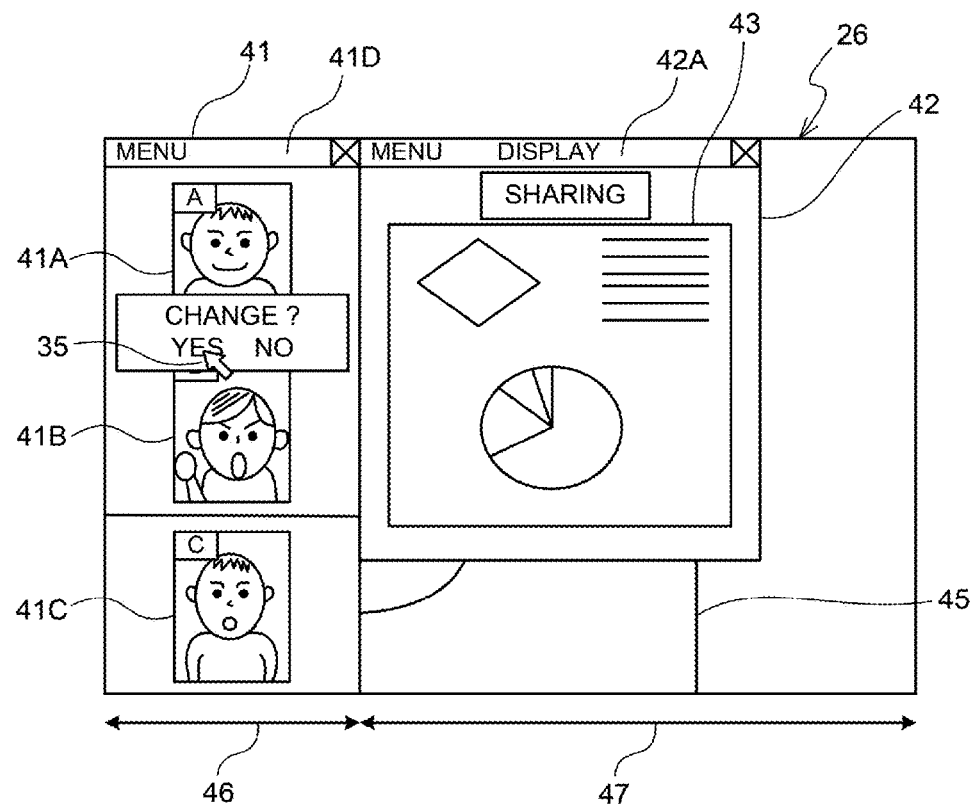
FIG. 7 is a diagram illustrating the display unit displaying a state before a presentation screen is changed as shared content.

Then, as shown in FIG. 7, another application for full-screen display is activated independently from the presentation application being activated, and the presentation screen 45 is once displayed in full-screen in the display unit 26. The presentation screen 45 is obtained by enlarging the presentation screen 43 included in the content screen 42 such that an aspect ratio of the presentation screen 43 is not changed. The presentation screen 45 is output by an application other than the presentation application. Therefore, the presentation screen 45 is not displayed in the content sharing display region 47 after being resized but is positioned in the display unit 26 on an upper left corner. The content screen 42 is still displayed in the content sharing display region 47 and the video-conference screen 41 is still displayed in the conference application display region 46. Note that the presentation screen 45 is in a full-screen display state as a background in the display unit 26. Therefore, the presentation screen 45 is hidden by the video-conference screen 41 and the content screen 42.

The CPU 21 determines whether the content sharing is terminated (in step S23) while an instruction for full-screen display is not issued to the monitoring target application (that is, when the determination is negative in step S14). When the determination is affirmative in step S23, the CPU 21 terminates the shared content display control process and returns to the display control process performed in step S5 shown in FIG. 4.

When the instruction for full-screen display is issued to the monitoring target application (that is, when the determination is affirmative in step S14), the CPU 21 determines whether the content application which is displayed in full-screen and the monitoring target application are different from each other (in step S15). As shown in FIG. 7, the presentation screen 45 is displayed in full-screen by the other application separately from the content screen 42 based on the monitoring target application. Since the content screen 42 corresponds to the current monitoring target application, the content screen 42 is being shared with the other sites. However, a screen that the user desires to display at the other sites may be the presentation screen 45 which is being displayed in full-screen. For example, when PowerPoint® is used as the presentation application, the presentation screen 45 is displayed independently from the content screen 42. Specifically, when the presentation screen 45 is displayed in another screen or another window or when the display is performed in another process, the presentation application is included in a range of meaning of "another application".

Figure 8:
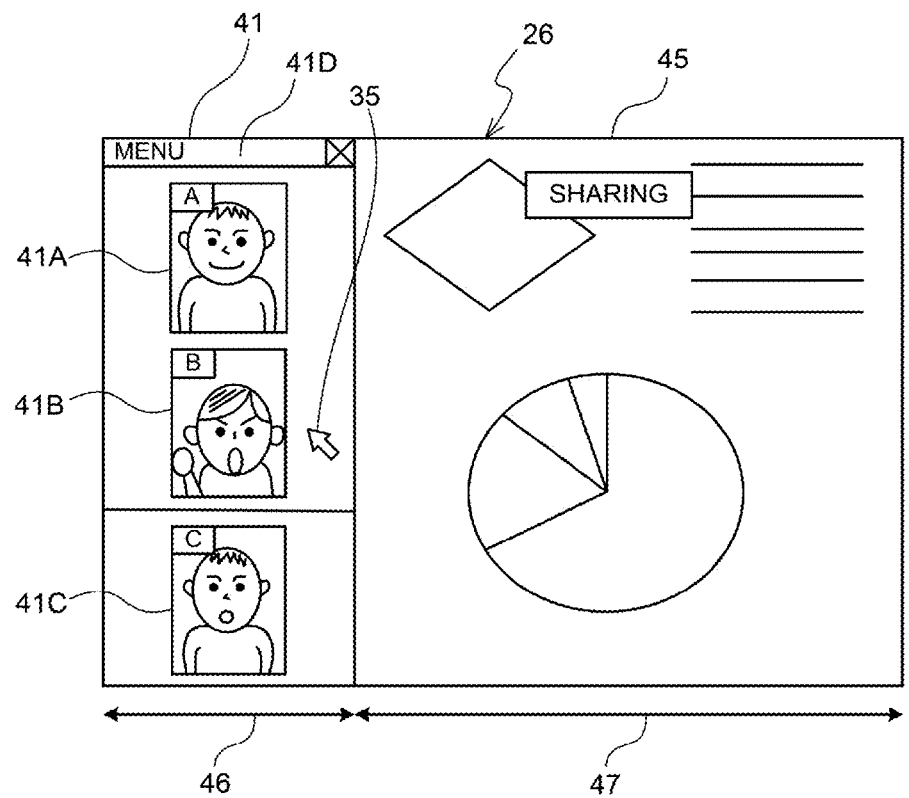
FIG. 8 is a diagram illustrating the display unit displaying the presentation screen which is maximized so as to fit a content sharing display region.

Therefore, since the CPU 21 determines that the application of the presentation screen 45 which is displayed in the display unit 26 in full-screen and the monitoring target application are different from each other (that is, the determination is affirmative in step S15), a confirmation message is displayed in the display unit 26 so that a determination as to whether the screen used for the content sharing is changed is made by the user. For example, as shown in FIG. 7, a confirmation message representing "Change? Yes or No" is displayed in the video-conference screen 41. When the screen used for content sharing is to be changed to the presentation screen 45, the user can move the pointer 35 onto text "Yes" in the confirmation message and select the text "Yes" by clicking The CPU 21 determines whether the shared content is to be changed (in step S17). When the user selects the text "Yes" so as to change the shared content (that is, when the determination is affirmative in step S17), the CPU 21 sets the presentation screen 45 which is being displayed in full-screen as the monitoring target application (in step S18). The CPU 21 does not change an aspect ratio of the presentation screen 45 corresponding to the monitoring target application but maximizes the presentation screen 45 to fit the content sharing display region 47 (in step S19). Then, as shown in FIG. 8, the presentation screen 45 is maximized in the content sharing display region 47 and a message "sharing" is displayed in an upper center portion of the presentation screen 45. The CPU 21 transmits content image data of the presentation screen 45 to the video conference apparatuses 3 and 4 at the other sites.

As described above, since the presentation screen 45 is maximized in the content sharing display region 47 included in the display unit 26 of the video conference apparatus 5, the presentation screen 45 does not overlap the video-conference screen 41 displayed in the conference application display region 46. Therefore, the user can simultaneously view the presentation screen 45 maximized in the content sharing display region 47 and the video-conference screen 41 displayed in the conference application display region 46 which are included in the display unit 26. Accordingly, a user-friendly video conference apparatus can be provided and the user can make a presentation using the maximized presentation screen 45 while viewing the camera images of the other users at the other sites using the video conference apparatus.

The CPU 21 determines whether the full-screen display of the monitoring target application is terminated (in step S20). The CPU 21 returns to step S20 and enters a standby state until the full-screen display of the monitoring target application is terminated (that is, the determination is negative in step S20). When the full-screen display of the monitoring target application is terminated (that is, when the determination is affirmative in step S20), the CPU 21 determines whether the monitoring target application is cancelled (in step S21). In this illustrative embodiment, after the full-screen display of the presentation screen 45 maximized in the content sharing display region 47 is terminated, the application used to display the presentation screen 45 is closed. Therefore, the presentation screen 45 corresponding to the monitoring target application is cancelled. When the monitoring target application is cancelled (that is, when the determination is affirmative in step S21), the CPU 21 sets the content screen 42 based on the content application as the monitoring target application again (in step S22). By this, the content sharing image is displayed in the content screen 42 again, and the content image data displayed in the content screen 42 is transmitted to the video conference apparatuses 3 and 4 in the other sites.

Then, the CPU 21 determines whether the content sharing is terminated (in step S23). When the content sharing is to be terminated, the user selects a button "end of content sharing" (not shown) in the video-conference screen 41. Until the user selects the button "end of content sharing" (that is, the determination is negative in step S23), the process returns to step S14 where it is determined whether an instruction for displaying a current monitoring target application in full-screen is issued. On the other hand, when the determination is affirmative in step S23, the CPU 21 terminates the shared content display control process and returns to the display control process performed in step S5 shown in FIG. 4.

Note that, as shown in FIG. 7, when the user selects the text "No" in the confirmation message (that is, when the determination is negative in step S17), the CPU 21 does not change the monitoring target application. In this case, since the content screen 42 remains as the monitoring target application, the state in which the content screen 42 is displayed in the content sharing display region 47 is maintained.

In the example described above, the content application activates another application when the instruction for displaying the content screen 42 in full-screen is issued. Then, the other application displays the presentation screen 45, which is different from the content screen 42, in full-screen. For example, PowerPoint® may serve as such a content application. In addition to such a content application having this function, another content application which displays a content screen in a maximum size without changing the application when the instruction for displaying the content screen in full-screen is issued may be used. Examples of such a content application include Adobe Acrobat Reader® or general image viewers. Adobe Acrobat Reader® is a content application used to view and edit PDF files.

Figure 9:
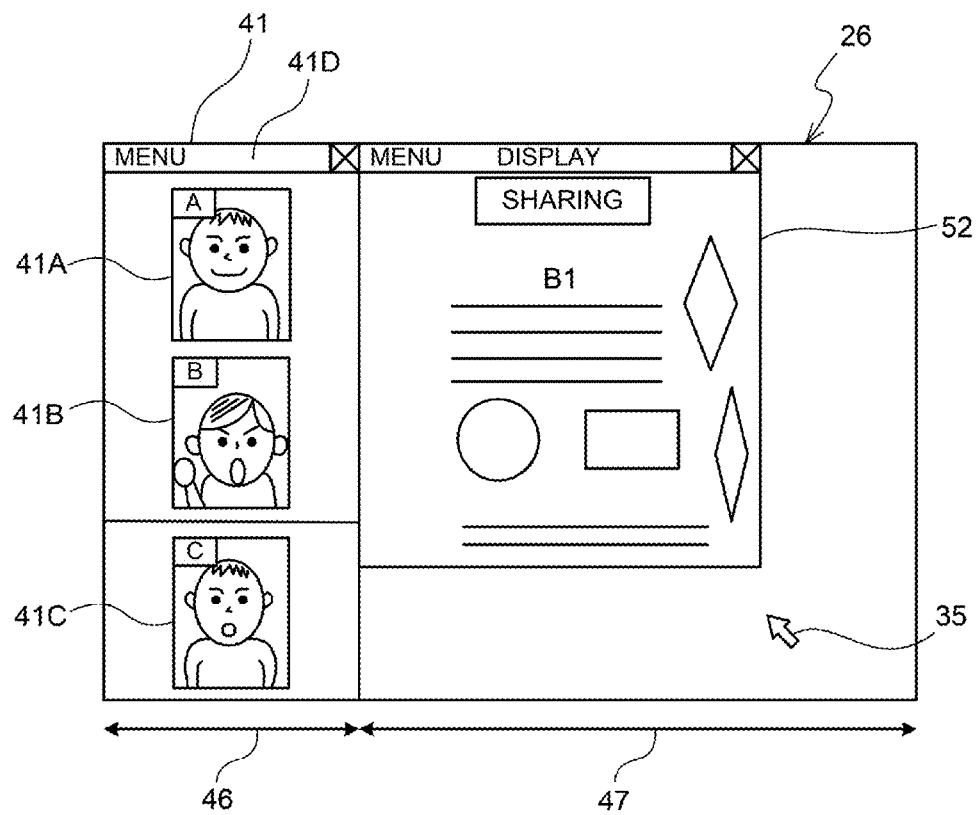
FIG. 9 is a diagram illustrating the display unit displayed when a content screen is determined as shared content.

Here, a case where a PDF file is shared as content sharing is described. As shown in FIG. 9, an instruction for displaying the content screen 52, in which the PDF file is displayed, in full-screen is issued. The CPU 21 starts the content sharing of the content screen 42 determined as a monitoring target application (in step S13) in the sharing content display control process shown in FIG. 5. As shown in FIG. 9, the video-conference screen 41 is displayed in the conference application display region 46 and the data screen 52 is displayed in the content sharing display region 47. A message "sharing" is displayed in an upper center portion of the content screen 52. In this state, the CPU 21 determines whether an instruction for displaying the content screen 52 in full-screen is issued (in step S14). When the instruction for displaying the content screen 52 in full-screen is issued (that is, when the determination is affirmative in step S14), the CPU 21 determines whether an application of the content screen displayed in full-screen in the display unit 26 and the monitoring target application are different from each other (in step S15).

When the instruction for displaying the content screen 52 in full-screen is issued, the content screen 52 which is the monitoring target application is displayed in full-screen. Therefore, the CPU 21 determines that the application displayed in full-screen in the display unit 26 is the same as the monitoring target application (that is, the determination is negative in step S15). The CPU 21 does not change the aspect ratio of the content screen 52 but resizes the content screen 52 to fit the content screen 52 to the content sharing display region 47. The content screen 52 is maximized in the content sharing display region 47 (in step S19). The content screen 52 can be also maximized in the content sharing display region 47, and accordingly, an effect the same as that of the foregoing illustrative embodiment can be obtained.

Thereafter, the CPU 21 determines whether the full-screen display of the content screen 52 corresponding to the monitoring target application is terminated (in step S20). When the full-screen display of the content screen 52 is terminated (that is, when the determination is affirmative in step S20), the CPU 21 determines whether the content screen 52 is cancelled (in step S21). When the full-screen display of the content screen 52 which is maximized in the content sharing display region 47 is terminated, the content screen 52 is displayed in a normal size. The application used to display the content screen 52 is still active. Therefore, the CPU 21 determines that the monitoring target application is not cancelled (that is, the determination is negative in step S21) and the monitoring target application is not changed. Thereafter, the CPU 21 determines whether the content sharing is terminated (in step S23). When the content sharing is terminated, the CPU 21 terminates the shared content display control process and returns to the display control process performed in step S5 shown in FIG. 4.

As described above, in the video conference apparatus 5 of this illustrative embodiment, when the instruction for starting content sharing is issued, the display unit 26 is divided into the conference application display region 46 and the content sharing display region 47. The video-conference screen 41 is displayed in the conference application display region 46. The content screen 42 is displayed in the content sharing display region 47. The content screen 42 is shared as the monitoring target application. Therefore, the content screen 42 is displayed also in the display units 26 of the video conference apparatuses 3 and 4.

When an instruction for displaying the content screen 42 in full-screen is issued, the presentation screen 45 is displayed in display unit 26 in full-screen. In this case, since the content screen 42 corresponding to the monitoring target application and the presentation screen 45 which is displayed in full-screen are different from each other, the presentation screen 45 is set as the monitoring target application. Therefore, the presentation screen 45 is used as shared content.

The presentation screen 45 set as the monitoring target application is maximized in the content sharing display region 47. Therefore, the presentation screen 45 does not overlap the video-conference screen 41 displayed in the conference application display region 46. The user can simultaneously view the presentation screen 45 maximized in the content sharing display region 47 and the video-conference screen 41 displayed in the conference application display region 46 which are included in the display unit 26. Accordingly, a user-friendly video conference apparatus can be provided and the user can make a presentation using the presentation screen 45 while viewing the camera images of the other users at the other sites using the video conference apparatus.

Furthermore, in this illustrative embodiment, when the content screen 42 corresponding to the monitoring target application and the presentation screen 45 displayed in full-screen are different from each other, a confirmation message is displayed in the display unit 26 to accept an input of a permission of the full-screen display from the user. Therefore, the presentation screen 45 is prevented from being displayed in full-screen such that the presentation screen 45 fits the content sharing display region 47 without the user's awareness.

Furthermore, in this illustrative embodiment, it is determined whether the instruction for displaying the content screen corresponding to the monitoring target application in full-screen is issued. Therefore, content which is not associated with shared content is prevented from unnecessarily being displayed in full-screen.

Figure 10:
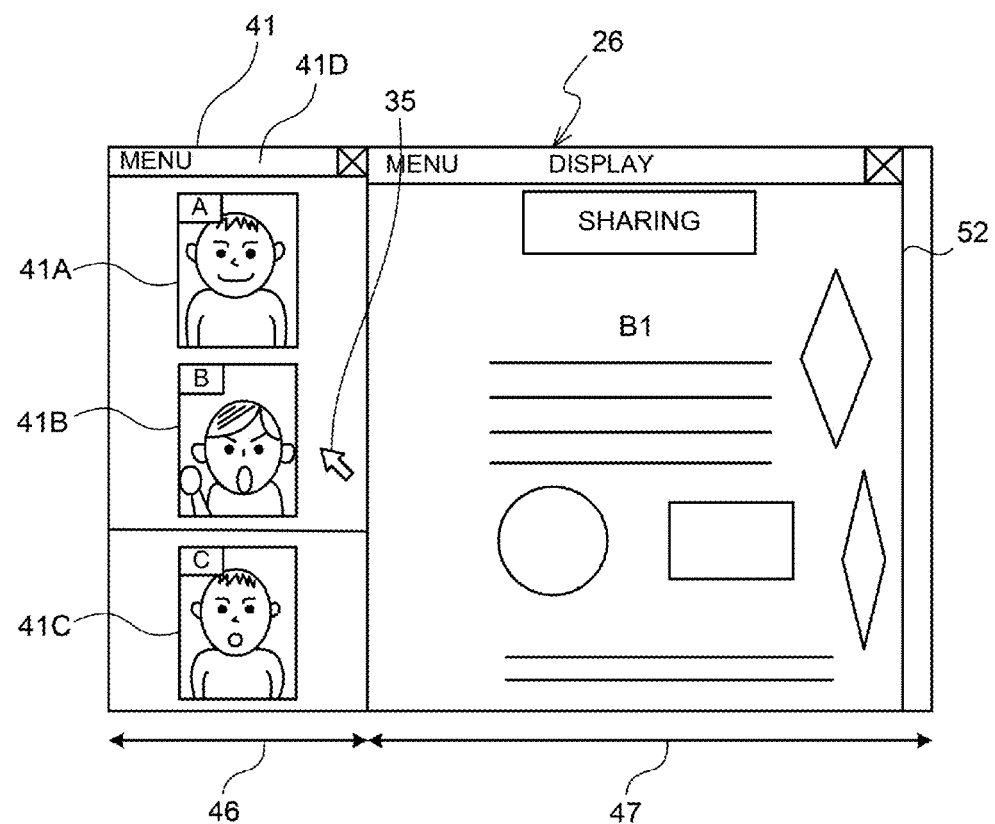
FIG. 10 is a diagram illustrating the display unit displaying the content screen which is maximized so as to fit the content sharing display region.

Note that the present disclosure is not limited to the foregoing illustrative embodiment and various modifications may be made. For example, in the foregoing illustrative embodiment, when the instruction for full-screen display is issued during content sharing, the content screen 52 corresponding to the monitoring target application is maximized in the content sharing display region 47 as shown in FIG. 10. However, the content screen 52 which is instructed to be displayed in full-screen may be displayed in the display unit 26 in full-screen and the video-conference screen 41 may be displayed to overlap a margin region of the content screen 52. This modification is described with reference to FIGS. 9, 12, and 13. This modification is different from the foregoing illustrative embodiment in a part of the shared content display control process executed by the CPU 21. Therefore, in this modification, portions different from the foregoing illustrative embodiment are mainly described.

Figure 5:
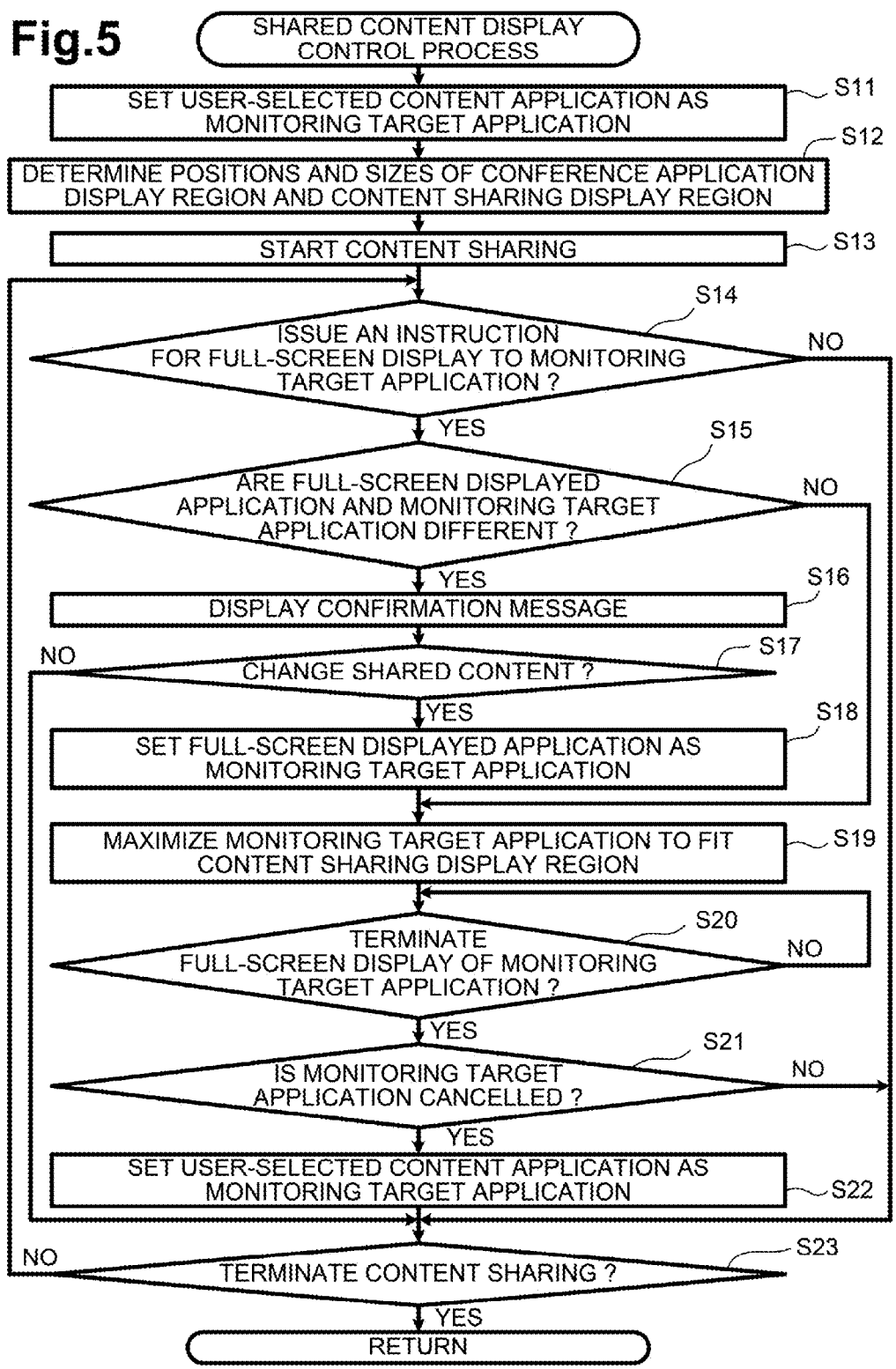
FIG. 5 is a flowchart illustrating a shared content display control process.
Figure 11B:
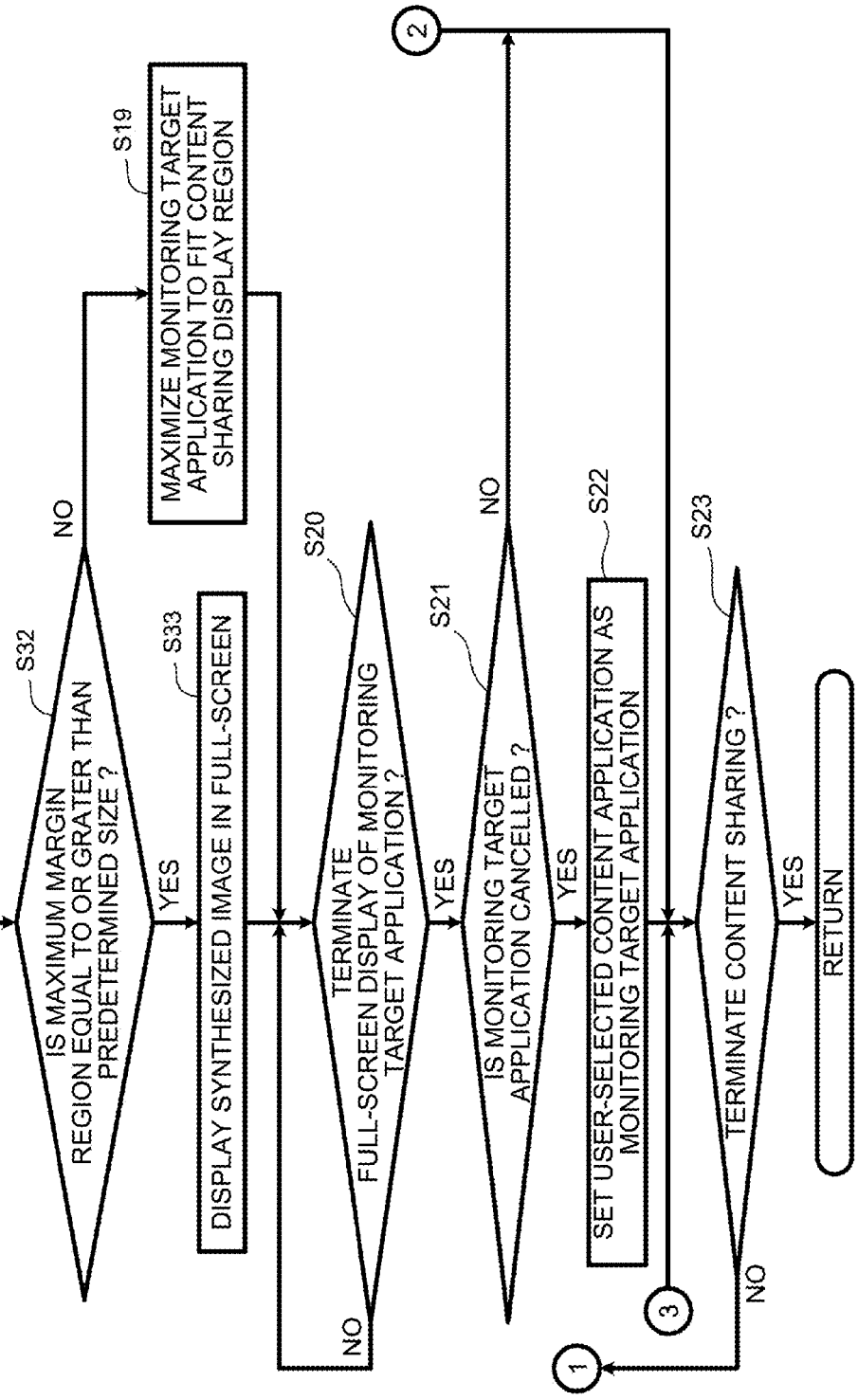
FIG. 11B is the rest of the flowchart illustrating a modification of the shared content display control process shown in FIG. 11A.

In a process of this modification, the CPU 21 executes a shared content display control process shown in FIG. 11 instead of that shown in FIG. 5. A process in step S31 to step S33 is different from the process in the foregoing illustrative embodiment. In the description below, a case where an instruction for full-screen display is issued in a state in which the content screen 52 corresponding to a monitoring target application shown in FIG. 9 is shared as content sharing will be described as an example.

As shown in FIG. 11, when starting content sharing (in step S13), the CPU 21 determines whether an instruction for full-screen display is issued to the monitoring target application (in step S14). When the instruction for full-screen display is issued to the monitoring target application (that is, when the determination is affirmative in step S14), the CPU 21 determines whether an application of a content screen displayed in the display unit 26 in full-screen and the monitoring target application are different from each other (in step S15). Since the CPU 21 determines that the application for the full-screen display in the display unit 26 and the monitoring target application are the same as each other as described above (that is, the determination is negative in step S15), a maximum margin region 60 is extracted from the content screen 52 of the monitoring target application (in step S31).

Figure 12:
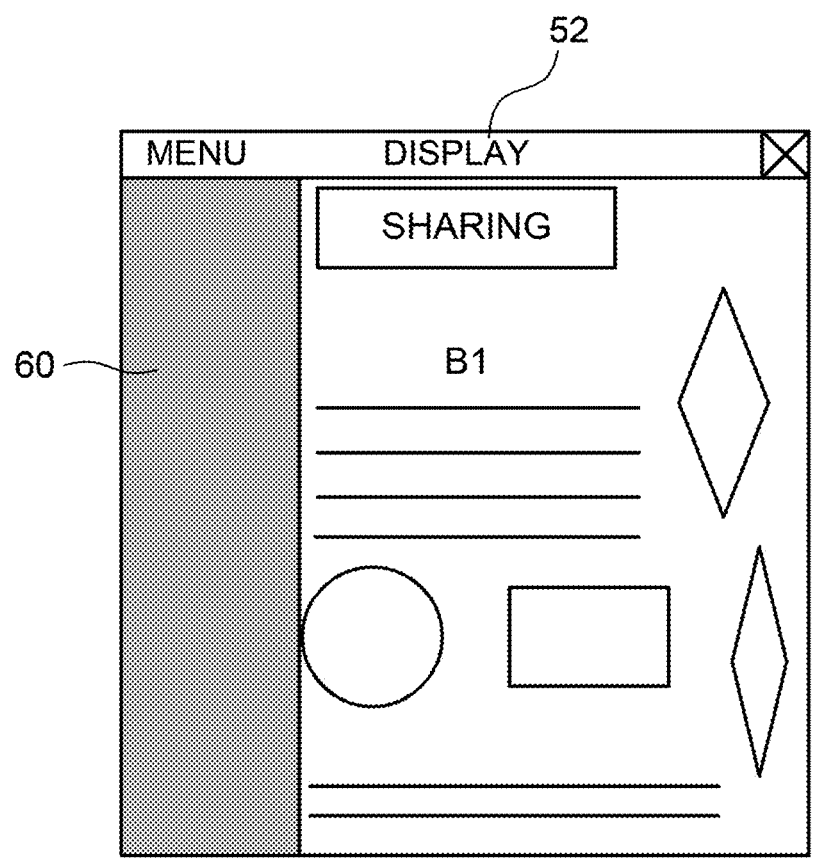
FIG. 12 is a diagram illustrating a state in which a maximum margin region is extracted from the content screen.
Figure 13:
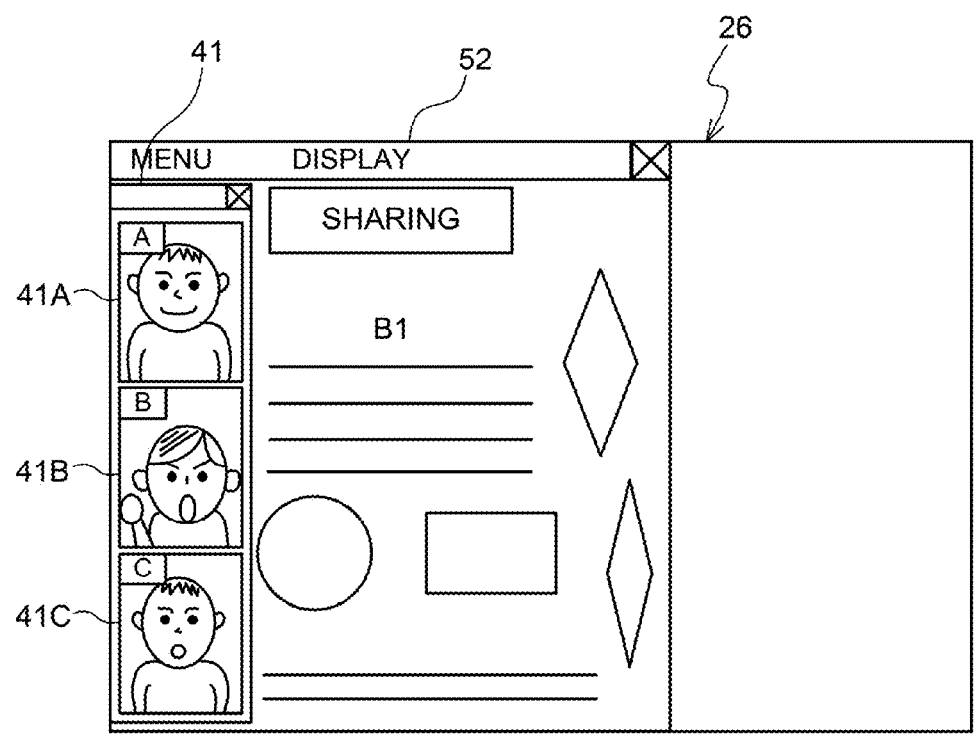
FIG. 13 is a diagram illustrating a state in which a video-conference screen is displayed such that the video-conference screen overlaps the maximum margin region of the content screen which is displayed in the display unit in full-screen.

As shown in FIG. 12, content image data of the content screen 52 includes a plurality of object data such as graphs, graphics, and text. The CPU 21 extracts margin regions located among the objects by image processing. For example, edge detection is performed on the content screen 52 and regions which include successive pixels and regions from which edges are not detected are determined as margin regions. Thereafter, the CPU 21 further extracts a maximum margin region 60 which has the largest rectangular margin region from among the extracted margin regions. In the example shown in FIG. 12, the maximum margin region 60 having a rectangle shape which is vertically long is extracted from a left portion in the content screen 52. The CPU 21 causes the RAM 23 to store positional information and size information of the maximum margin region 60.

Next, the CPU 21 determines whether the maximum margin region 60 extracted from the content screen 52 is equal to or larger than a predetermined size (in step S32). Note that the predetermined size is preferably at least equal to or larger than an area of the video-conference screen 41. When determining that the maximum margin region 60 is equal to or larger than the predetermined size (that is, when the determination is affirmative in step S32), the CPU 21 synthesizes the maximum margin region 60 included in the content screen 52 and the video-conference screen 41 by resizing the video-conference screen 41 and superimposing the video-conference screen 41 on the maximum margin region 60. The CPU 21 displays a resultant synthesized image in the display unit 26 in full-screen (in step S33). In the video-conference screen 41, the site screens 41A to 41C can fit the maximum margin region 60 by appropriately changing arrangement and sizes of the site screens 41A to 41C. Also in this modification, the video-conference screen 41 can be displayed while the content screen 52 is displayed in the display unit 26 in full-screen.

On the other hand, when the maximum margin region 60 is smaller than the predetermined size (that is, when the determination is negative in step S32), the video-conference screen 41 protrudes from the maximum margin region 60 when the video-conference screen 41 overlaps the maximum margin region 60. Therefore, as with the foregoing illustrative embodiment, the CPU 21 resizes the presentation screen 45 corresponding to the monitoring target application to fit the presentation screen 45 to the content sharing display region 47. The presentation screen 45 is maximized in the content sharing display region 47 (in step S19). In this way, display states of the video-conference screen 41 and the presentation screen 45 may be changed in accordance with an area of the maximum margin region 60 extracted from the content screen 52.

Note that, in this modification, the maximum margin region 60 is extracted from the content screen 52 corresponding to the monitoring target application. Furthermore, the video-conference screen 41 is displayed in a state in which the video-conference screen 41 overlaps the maximum margin region 60 so as to fit the maximum margin region 60. However, instead of the margin, a region other than a specific region may be extracted and the video-conference screen 41 may be displayed in a state in which the video-conference screen 41 overlaps the extracted region.

The foregoing description of embodiments has been presented for purposes of illustration and description. The foregoing description is not intended to be exhaustive or to limit embodiments of the disclosure to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the disclosure in various embodiments and with various modifications as are suited to the particular use contemplated. The features of the embodiments described herein may be combined in all possible combinations of methods, apparatuses, modules, systems, and machine-readable storage media. Any and all permutations of features from the above-described embodiments are the within the scope of the invention.

What is claimed is:

1. A video conference apparatus, comprising:
    a communication unit configured to connect to another video conference apparatus at another site; and
    a processor configured to control the video conference apparatus to:
        initiate transmission of an image of shared content to the other video conference apparatus through the communication unit;
        determine, when the transmission of the image of the shared content is initiated, a first region and a second region of a display connected to the video conference apparatus, the first region configured to display the image of the shared content, and the second region configured to display a captured image, the first region including at least a portion different from the second region, the captured image being received from the other video conference apparatus;
        monitor the shared content, the image of the shared content being transmitted;
        determine whether an instruction for full-screen display is issued regarding the monitored shared content;
        determine whether an image of full-screen display content generated on the basis of the shared content is to be displayed in full-screen separately from the monitored shared content, when determining that the instruction for full-screen display is issued; and
        display the image of the full-screen display content at a region including the first region and continue to display the captured image at the second region when determining that the instruction for full-screen display is issued.

2. The video conference apparatus according to claim 1, wherein the processor is further configured to control the video conference apparatus to:
change a target to be monitored from the shared content to the full-screen display content when determining that the image of the full-screen display content is to be displayed in full-screen.

3. The video conference apparatus according to claim 2, wherein the image of the full-screen display content is displayed to fit in the first region.

4. The video conference apparatus according to claim 1, wherein the processor is further configured to control the video conference apparatus to:
accept a user's input representing a permission or prohibition of the full-screen display of the shared content image in the first region when determining that the instruction for full-screen display is issued.

5. The video conference apparatus according to claim 4, wherein the shared content image is displayed in full-screen to fit the first region when the user's input represents permission.

6. The video conference apparatus according to claim 1, wherein the processor is further configured to control the video conference apparatus to:
extract a region other than a specific region from the shared content image when determining that the instruction for full-screen display is issued.

7. The video conference apparatus according to claim 6, wherein the processor is further configured to control the video conference apparatus to:
determine whether the extracted region is equal to or larger than a predetermined size.

8. The video conference apparatus according to claim 7, wherein the shared content image is displayed in full-screen to fit an output image and the captured image superimposes the extracted region, when determining that the extracted region is equal to or larger than the predetermined size.

9. A method comprising:
initiating transmission of an image of shared content;
determining a first region and a second region of a display, the first region configured to display the image of the shared content and the second region configured to display a captured image, the first region including at least a portion different from the second region, the captured image being captured by an image capturing unit;
monitoring the shared content, the image of the shared content being transmitted;
determining whether an instruction for full-screen display is issued regarding the monitored shared content; and
determine whether an image of full-screen display content generated on the basis, of the shared content is to be displayed in full-screen separately from the monitored shared content, when determining that the instruction for full-screen display is issued; and
causing the full-screen display of the image of the full-screen display content to fit in the first region when determining that the instruction for full-screen display is issued and when determining that the image of full-screen display content is to be displayed in full-screen separately from the monitored shared content.

10. A non-transitory computer readable recording medium storing computer readable instructions that, when executed, cause a video conference apparatus to:
initiate transmission of an image of shared content to another video conference apparatus at another site;
monitor the shared content, the image of the shared content being transmitted;
determine whether an instruction for full-screen display is issued regarding the monitored shared content; and
determine whether an image of full-screen display content generated on the basis of the shared content is to be displayed in full-screen separately from the monitored shared content, when determining that the instruction for full-screen display is issued.

11. The non-transitory computer readable medium according to claim 10, wherein the computer readable instructions, when executed, further cause the video conference apparatus to:
change a target to be monitored from the shared content to the full-screen display content when determining that the image of the full-screen display content is displayed in full-screen.

12. The non-transitory computer readable medium according to claim 11, wherein the computer readable instructions that, when executed, further cause the video conference apparatus to:
determine whether the full-screen display content is cancelled; and
monitor the shared content again when determining that the full-screen display content is cancelled.

13. The non-transitory computer readable recording medium according to claim 10, wherein the computer readable instructions that, when executed, further cause the video conference apparatus to:
determine, when the transmission of the image of the shared content is initiated, a first region and a second region of a display connected to the video conference apparatus, the first region configured to display the image of the shared content, and the second region configured to display a captured image, the first region including at least a portion different from the second region, the captured image being received from the other video conference apparatus.

14. The non-transitory computer readable recording medium according to claim 13, wherein the computer readable instructions that, when executed, further cause the video conference apparatus to:
display an image of the full-screen display content at a region including the first region and continue to display the captured image at the second region when determining that the instruction for full-screen display is issued and when determining that the full-screen display content is to be displayed in full-screen separately from the monitored shared content.

15. The non-transitory computer readable recording medium according to claim 14, wherein the image of the full-screen display content is displayed to fit in the first region.

16. The non-transitory computer readable recording medium according to claim 10, wherein the computer readable instructions that, when executed, further cause the video conference apparatus to:
transmit an image of the full-screen display content to the other video conference apparatus when determining that the instruction for full-screen display is issued and when determining that the image of full-screen display content is to be displayed in full-screen separately from the monitored shared content.

17. The non-transitory computer readable recording medium according to claim 10, wherein the shared content is a first application and the full-screen display content is a second application different from the first application.

18. The video conference apparatus according to claim 2, wherein the processor is further configured to control the video conference apparatus to:
   determine whether the full-screen display content is cancelled; and
   monitor the shared content again when determining that the full-screen display content is cancelled.

19. The video conference apparatus according to claim 1, wherein the shared content is a first application and the full-screen display content is a second application different from the first application.

20. The method according to claim 9, further comprising:
   changing a target to be monitored from the shared content to the full-screen display content when determining that the image of the full-screen display content is to be displayed in full-screen.

* * * * *